United States Patent
Koch

(10) Patent No.: US 12,467,627 B2
(45) Date of Patent: Nov. 11, 2025

(54) ELECTRIC PROPULSION SYSTEM INCLUDING HEATERLESS DISPENSER CATHODE

(71) Applicant: Aerojet Rocketdyne, Inc., Melbourne, FL (US)

(72) Inventor: Brian A. Koch, Sacramento, CA (US)

(73) Assignee: Aerojet Rocketdyne, Inc., Melbourne, FL (US)

( * ) Notice: Subject to any disclaimer, the term of this patent is extended or adjusted under 35 U.S.C. 154(b) by 0 days.

(21) Appl. No.: 18/733,971

(22) Filed: Jun. 5, 2024

(65) Prior Publication Data

US 2024/0318820 A1    Sep. 26, 2024

Related U.S. Application Data

(63) Continuation of application No. 17/442,434, filed as application No. PCT/US2019/030114 on May 1, 2019, now Pat. No. 12,044,407.

(51) Int. Cl.
*H01J 17/30*    (2006.01)
*B64G 1/40*    (2006.01)
(Continued)

(52) U.S. Cl.
CPC .............. *F23Q 3/004* (2013.01); *B64G 1/411* (2023.08); *B64G 1/413* (2023.08); *B64G 1/428* (2013.01); *H01J 17/30* (2013.01)

(58) Field of Classification Search
CPC ...... F02N 11/08; F02N 11/0862; H01J 17/30; B64G 1/409; B64G 1/415; B64G 1/428;
(Continued)

(56) References Cited

U.S. PATENT DOCUMENTS 3,629,652 A * 12/1971 Maycock ............... H03K 3/543
                                                    315/239
4,922,883 A    5/1990 Iwasaki et al.
(Continued)

OTHER PUBLICATIONS

International Preliminary Report on Patentability for International Patent Application No. PCT/US2019/030114 completed on Nov. 2, 2021.
(Continued)

*Primary Examiner* — Danny Nguyen
(74) *Attorney, Agent, or Firm* — Carlson, Gaskey & Olds, P.C.

(57) ABSTRACT

A circuit for igniting and sustaining an electron discharge includes an ignitor circuit. The ignitor circuit includes a high voltage transformer and a switch connected in series between a primary of the transformer and a DC source return. The switch is configured to receive a driving signal. A reset circuit is connected in parallel to the primary of the high voltage transformer. A first rectifier is connected in series between a secondary of the high voltage transformer and a keeper. A terminal of the secondary of transformer is connected to a cathode. The circuit for igniting and sustaining the electron discharge also includes a sustaining circuit having a current source with a return connected to a cathode and a second rectifier connected in series between the current source and the keeper.

14 Claims, 1 Drawing Sheet

(51) Int. Cl.
*B64G 1/42* (2006.01)
*F23Q 3/00* (2006.01)

(58) Field of Classification Search
CPC .. F23Q 3/004; F23Q 3/00; F02C 7/266; F02P 3/00
USPC ........................................................ 361/257
See application file for complete search history.

(56) References Cited

U.S. PATENT DOCUMENTS

| | | | |
|---|---|---|---|
| 5,485,361 A | 1/1996 | Sokal | |
| 6,647,974 B1* | 11/2003 | Cowan | F02P 3/10 123/622 |
| 7,986,505 B2* | 7/2011 | Roscoe | H01T 2/02 361/230 |
| 12,044,407 B2* | 7/2024 | Koch | B64G 1/409 |

| | | |
|---|---|---|
| 2005/0174120 A1 | 8/2005 | McQueeney et al. |
| 2013/0308245 A1 | 11/2013 | Saxena et al. |
| 2018/0041060 A1 | 2/2018 | Walley et al. |

OTHER PUBLICATIONS

Caldwell, David J., System Design of Elite Power Processing Unit, Institute of Electrical and Electronics Engineers, Aerospace Power Systems, Boston, Aug. 4-9, 1991; [Proceedings of the Intersociety Energy Conversion Engineering Conference], New York, IEEE, US, vol. 2, Aug. 4, 1991 (Aug. 4, 1991), pp. 174-179, XP000280497, ISBN: 978-0-89448-163-5.

Carpenter, Christian B, et al., High-Current Hollow Cathode Development, Proceedings of the International Electric Propulsion Conference, No. IEPC-01-274, Oct. 15, 2001 (Oct. 15, 2001). pp. 1-8. XP00246048.

International Search Report and Written Opinion for International Patent Application No. PCT/US2019/030114 completed on Jan. 20, 2020.

* cited by examiner

ELECTRIC PROPULSION SYSTEM INCLUDING HEATERLESS DISPENSER CATHODE

CROSS-REFERENCE TO RELATED APPLICATION

This application is a continuation of application Ser. No. 17/442,434, filed Sep. 23, 2021, which claims priority to International Patent Application No. PCT/US2019/030114 filed on May 1, 2019, the disclosures of each of these applications are incorporated by reference in their entirety.

TECHNICAL FIELD

The present disclosure relates generally to electric propulsion devices, and more specifically to an electric propulsion system utilizing a heaterless dispenser cathode.

BACKGROUND

Satellites, and other small electrical units utilized in space based applications typically include on board propulsion systems in order to achieve precise control of the position and orientation of the units. Traditionally, such systems utilized chemical propulsion, as chemical propulsion provides large amounts of thrust. However, chemical propulsion systems require a large propellant mass, a high temperature and pressure, and consume potentially dangerous or difficult to handle propellants.

One alternative propulsion system is an electric propulsion system. Electric propulsion systems have a high exhaust velocity and fuel efficiency, and are generally divided into three categories: Electrothermal, Electrostatic, and Electromagnetic. A central part of electric propulsion systems is the utilization of a cathode to generate electrons, which are used to ignite the discharge. Multiple different methods can be used to ignite a cathode discharge in a vacuum including gas injection, high voltage breakdown, mechanical actuators to create drawn arcs, and detonation of fuse wire.

SUMMARY OF THE INVENTION

In one exemplary embodiment a circuit for igniting and sustaining an electron discharge includes an ignitor circuit including a high voltage transformer, a switch connected in series between a primary of the transformer and a DC source return, the switch configured to receive a driving signal, a reset circuit connected in parallel to the primary of the high voltage transformer, a first rectifier connected in series between a secondary of the high voltage transformer and a keeper, a terminal of the secondary of transformer connected to a cathode, and a sustaining circuit having a current source having a return connected to a cathode, and a second rectifier connected in series between the current source and the keeper.

Another example of the above described circuit for igniting and sustaining an electron discharge further includes a plurality of power sources connected to at least one input power connection, the at least one power input connection providing input power to each of the ignitor circuit and the sustaining circuit.

In another example of any of the above described circuits for igniting and sustaining an electron discharge the high voltage transformer is a high ratio transformer connected to a DC power source through the at least one power input.

In another example of any of the above described circuits for igniting and sustaining an electron discharge the high ratio transformer has a winding ratio of at least 10 to 1.

In another example of any of the above described circuits for igniting and sustaining an electron discharge the winding ratio is at least 100:1.

In another example of any of the above described circuits for igniting and sustaining an electron discharge the winding ratio is approximately 60:1.

In another example of any of the above described circuits for igniting and sustaining an electron discharge the circuit characterized by a lack of an output capacitor.

In another example of any of the above described circuits for igniting and sustaining an electron discharge the reset circuit is a linear arranged diode and Zener diode.

In another example of any of the above described circuits for igniting and sustaining an electron discharge the switch connected in series between a primary of the transformer and a DC source return switch is controlled via a controller.

In another example of any of the above described circuits for igniting and sustaining an electron discharge the switch is a MOSFET (metal oxide semi-conductor field effect transistor).

In another example of any of the above described circuits for igniting and sustaining an electron discharge when the switch is control closed, and the DC source is applied across a primary of the transformer to produce a high voltage on a secondary of the transformer.

In another example of any of the above described circuits for igniting and sustaining an electron discharge the current source comprises an isolated converter and an inductor.

In another example of any of the above described circuits for igniting and sustaining an electron discharge the current source is a buck based converter.

In another example of any of the above described circuits for igniting and sustaining an electron discharge the sustaining circuit further comprises a DC load connecting an input of the second rectifier to a DC return of the isolated converter.

These and other features of the present invention can be best understood from the following specification and drawings, the following of which is a brief description.

DETAILED DESCRIPTION

Dispenser cathodes utilize a heater to warm up the dispenser cathode in order to allow the insert in the dispenser cathode to produce thermionic electrons. The thermionic electrons interact with low pressure gas in the dispenser cathode to produce ions and free electrons that make up the cathode discharge. The heaters are physical components that partially surround the cathode and convert stored electrical energy to heat energy. The presence of heaters increases the weight of the electrical unit, as well as increasing the electrical load drawn by the unit, but most significantly the heater is a reliability risk and is difficult to produce.

Dispenser cathodes are normally enclosed in another electrode referred to as a keeper. A major function of the keeper electrode is to facilitate turning on the cathode discharge and sustaining operation by providing an path to attract electrons when no other paths are available.

Figure 1:
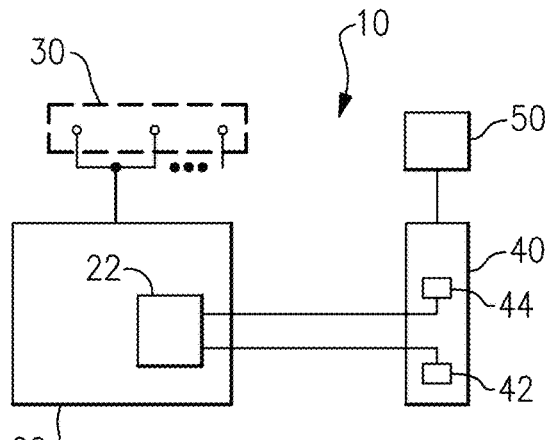
FIG. 1 schematically illustrates an electric thruster for a satellite.

FIG. 1 schematically illustrates an exemplary electric propulsion system 10 for a satellite, or other space fairing electrical unit. The electric propulsion system 10 includes a power processing unit 20 connected to multiple power supplies 30. Within the power processing unit 20 is an ignitor circuit 22. The ignitor circuit 22 for igniting and sustaining a cathode generates two power outputs, one of which is provided to a cathode 42 and the other of which is provided to a keeper 44. The cathode 42 and the keeper 44 are contained within a thruster 40. The thruster 40 is fluidly connected to a gas supply 50.

While illustrated in the example of FIG. 1 as including a single ignitor circuit 22 and a single thruster 50, it is appreciated that the ignitor circuit 22, and the thruster 50 could be duplicated as needed to provide any number of additional thrusters required for a given space fairing electric unit.

The ignitor circuit 22 for igniting and sustaining a cathode is configured to receive power from the power supplies 30 through the power processing unit 20, and to provide the processed power to the cathode 42 and the keeper 44. In order for the thruster 40 to ignite, and run the heaterless cathode 42, two electrical conditions are required from the outputs of the ignitor circuit 22. First, the output provided to the keeper 44 must be a high enough voltage to break down the low pressure gas in the cathode 42. Second, the current from the ignitor circuit 22 for igniting and sustaining a cathode must be limited to a low enough magnitude that damaging vacuum arcs are prevented from occurring.

In ground based test systems (i.e. in laboratory conditions), this can be achieved using a 1500 V supply that is current limited to between 0.15 A and 0.3 A with an additional 1KΩ resistor in sequence. However, to achieve these conditions the circuitry used is bulky and expensive. Further, exactly matching the laboratory systems in a satellite would require too much weight to be implemented in a practical construction.

In order to achieve these conditions in a smaller package, the electric propulsion system 10 provides separate outputs from the ignitor circuit 22 to the keeper 44 and the cathode 42. With continued reference to FIG. 1, FIG. 2 schematically illustrates the ignitor circuit 22 within the power processing unit 20 in greater detail.

The ignitor circuit 22 for igniting and sustaining a cathode is connected to the power supplies 30 via a processed power input 102, and can generally be divided into two circuits, an ignitor circuit 101 and a sustaining circuit 103. Depending on the condition of the power provided from the power supplies 30, the power received at the power input 102 can either be processed by additional circuitry within the power processing unit 20 or provided directly to the input 102 from the power supplies 30. Once received at the input 102, the power is provided to a high ratio transformer 110, a core reset circuit 114 and current source 105 including an isolated converter 130 and an inductor 140.

Figure 2:
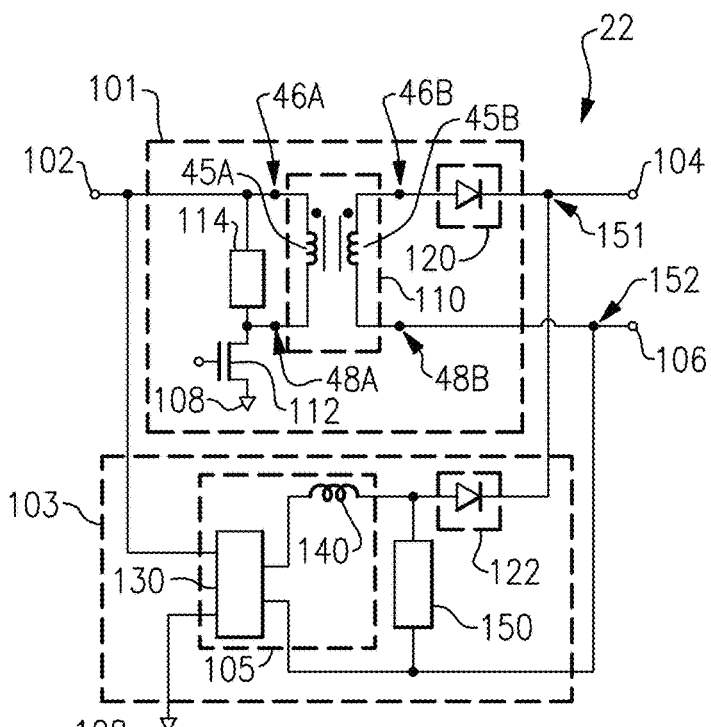
FIG. 2 schematically illustrates an ignitor circuit for utilization in the electric thruster of FIG. 1.

As shown in FIG. 2, the high ratio transformer 110 includes a primary 45A and a secondary 45B. The primary 45A has a dot terminal 46A and a non-dot terminal 48A. Similarly, the secondary 45B has a dot terminal 46B and a non-dot terminal 48B. The high ratio transformer 110 provides a positive output (via dot terminal 46B) to an output rectifier 120, which in turn provides the positive output to the keeper 44 via a node 151 and a power output 104. The negative output of the high ratio transformer 110 is provided, through non-dot terminal 48B and via a node 152, to a second output 106 which outputs power to the cathode 42. The transformer 110 omits output capacitance and allows the transformer 110 to supply a high voltage without storing any energy. In some examples the winding ratio required of the high ratio transformer is on greater than 10:1.

Figure 3:
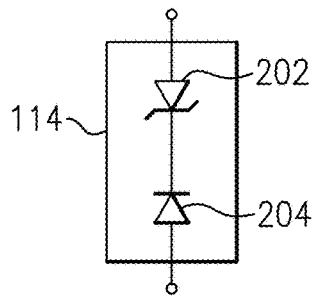
FIG. 3 schematically illustrates an exemplary core reset circuit.

The core reset circuit 114 is, in one example, a linear arranged diode 204 and a Zener diode 202. This example is illustrated in FIG. 3. The core reset circuit 114 is connected in parallel to the transformer 110, with the high voltage side of the core reset circuit 114 being connected to a high voltage input of the transformer 110, and the low voltage side of the core reset circuit 114 being connected to a low voltage input of the transformer 110. The low voltage side of the core reset circuit 114 is connected to the non-powered leg of the transformer 110. The non-powered leg of the transformer 110 also connects to switch 112 that will connect the non-powered leg to neutral 108 when the switch 112 is closed, and disconnect the transformer when the switch is open. When the switch 112 is closed the diode 204 in the core reset circuit 114 blocks current through the core reset circuit 114. When the switch 112 is opened the diode 204 in the core reset circuit 114 allows magnetizing current through the core reset circuit 114 and the voltage drop across the Zener diode 202 is impressed on the transformer 110 primary providing the voltage to bring the flux in the transform 110 to a reset state.

During operation, an exterior control circuit (contained within the power processing unit 20, or elsewhere in the electric unit) provides pulses to the switch 112. The pulses effectively connect the bus voltage from the power input 102 across the primary winding of the transformer 110 to produce a high voltage on the secondary winding of the transformer 110. When the switch 112 is pulsed off, the parasitic capacitance in the cabling to the ignitor 44 and the series impedance in the transformer 110 and switches 112 maintain the required high voltage, with some droop until the next on cycle of the switch 112. The transformer core and turn count is sized to prevent saturation of the core during the duration of the switch 112 being closed, and the sizing can be achieved according to any known methodology. In a practical implementation, during an ignition pulse train, the voltage provided to the keeper 44 is not flat (i.e., not constant) since there is a ramp up time when the switch 112 is on and a decay in the voltage during the off time of the switch. The general form of the resultant voltage provided to the keeper is a saw tooth pattern offset by a DC pulse.

The time period between the pulses of the switch 112 and the core reset circuit 114 provides the duration and voltage reset to the core of the transformer 110 and brings the transformer 110 back to flux zero. With this configuration, the voltage can be kept high indefinitely until a current is detected in the cathode, or pulses can be output in periodic groups to produce a pulse train to the keeper 44, depending on the specific needs of a given electric thruster 40.

If the turn on duration of the switch 112 is held constant, the magnitude of the ignition voltage is dependent on the input voltage to the keeper 44. Doing this can change the required ignition voltage by up to 50% for a typical input. The variability in the ignition pulse voltage caused by the input voltage is reduced in some examples by making the ignition pulse width dependent on the ignition voltage. This is achieved via any conventional digital or analog control system.

To provide the sustaining current through the keeper 44 to the cathode 42 after discharge has started, an isolated converter 130 provides the requisite voltage and amperage.

By way of example, the isolated converter 130 can be configured to provide anywhere 20 to 400 V at 0.15 to 0.3 A, and can be a push pull converter, or any other type of switch mode converter. In alternative examples, any other current magnitude can be achieved using a similar configuration with appropriate scaling.

In order to omit cathode heaters entirely, the cathode 42 is a self-heating cathode. The self-heating cathode converts a portion of the received electrical current to heat energy which then raises the temperature of the cathode. In order to ensure that a continuous current is received at the cathode 42, and thus the self-heating function is maintained throughout operation, an inductor 140 connects the output of the isolated converter 130 to a second rectifier 122. The second rectifier 122 is connected to the cathode output 106 via node 152, and is a diode in the illustrated example.

The cathode 42 discharge sets the voltage to an effective DC voltage level while feedback of the current is used to control the current magnitude supplied to the cathode 42. The current source provides the DC current before the ignition of the cathode 42. In order to ensure this is achieved, the exemplary implementation of FIG. 2 includes a DC load 150. The DC load 150 can be a switched resistance, a string of Zener diodes, or any similar device that the discharge supply can be pre-charged into. The voltage of the load 150 is set to a higher level than the expected discharge so that when the cathode discharge is ignited, current naturally diverts from the load 150 to the cathode discharge. In order to prevent the discharge supply and load from shunting all the energy, the discharge and load 150 are connected to the ignitor 44 through a high voltage diode 122. The high voltage diode 122 is sized to withstand a full magnitude of the ignition pulse.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A circuit for igniting and sustaining an electron discharge, comprising:
    an ignitor circuit including:
        a voltage transformer which is an in-phase transformer that includes a primary and a secondary, the primary including a first dot terminal and a first non-dot terminal, and the secondary including a second dot terminal and a second non-dot terminal;
        a reset circuit connected in parallel to the primary of the voltage transformer, and configured to provide a flux reset to a core of the transformer;
        a first rectifier connected in series between the second dot terminal of the secondary of the voltage transformer and a first node, the first node connecting an output of the first rectifier to a keeper;
        the second non-dot terminal of the secondary of the voltage transformer connected to a dispenser cathode via a second node that is different than the first node; and
    a sustaining circuit including:
        a current source having a return connected to the second node; and
        a second rectifier connected in series between the current source and the first node; and
        a DC load that is separate from the current source, that connects an input of the second rectifier to the second node, and that has a voltage that is higher than a voltage of the dispenser cathode.

2. The circuit of claim 1, further comprising a plurality of power sources connected to at least one input power connection, the at least one power input connection providing input power to each of the ignitor circuit and the sustaining circuit.

3. The circuit of claim 2, wherein the voltage transformer is connected to a DC power source through the at least one power input.

4. The circuit of claim 3, wherein the high ratio transformer has a winding ratio of at least 10 to 1.

5. The circuit of claim 4, wherein the winding ratio is at least 100:1.

6. The circuit of claim 4, wherein the winding ratio is approximately 60:1.

7. The circuit of claim 1, wherein the circuit characterized by a lack of an output capacitor.

8. The circuit of claim 1, wherein:
    the reset circuit comprises a diode and Zener diode connected in series;
    a cathode of the diode and a cathode of the Zener diode are connected in series;
    an anode of the diode is connected in series to a first terminal of the reset circuit; and
    an anode of the Zener diode is connected in series to a second terminal of the reset circuit that is different from the first terminal.

9. The circuit of claim 8, comprising:
    a switch connected in series between the first-non dot terminal of the primary of the transformer and a DC source return, the switch configured to receive a driving signal;
    wherein the switch is connected in series between a primary of the transformer and a DC source return, and the switch is controlled via a controller.

10. The circuit of claim 9, wherein the switch is a MOSFET (metal oxide semi-conductor field effect transistor).

11. The circuit of claim 1, wherein when the switch is closed, and the DC source is applied across a primary of the transformer to produce a voltage on a secondary of the transformer.

12. The circuit of claim 1, wherein the current source comprises an isolated converter and an inductor.

13. The circuit of claim 12, wherein the current source is a buck based converter.

14. The circuit of claim 12, wherein the sustaining circuit further comprises a DC load connecting an input of the second rectifier to the second node.

* * * * *